United States Patent
Lee

(10) Patent No.: US 7,150,564 B2
(45) Date of Patent: Dec. 19, 2006

(54) STRUCTURE OF LINEAR SLIDING RAIL CIRCULATING DEVICE

(75) Inventor: Mao-Tu Lee, Taipei Hsien (TW)

(73) Assignee: Linear Tech Co., Ltd., Taipei Hsien (TW)

( * ) Notice: Subject to any disclaimer, the term of this patent is extended or adjusted under 35 U.S.C. 154(b) by 117 days.

(21) Appl. No.: 10/961,115

(22) Filed: Oct. 12, 2004

(65) Prior Publication Data

US 2006/0078236 A1   Apr. 13, 2006

(51) Int. Cl.
   *F16C 29/06* (2006.01)
(52) U.S. Cl. .......................... 384/45; 384/15
(58) Field of Classification Search .................. 384/13, 384/15, 43–45; 74/424.81, 424.82, 424.83, 74/424.86, 424.88, 89.33, 89.32, 89.44
   See application file for complete search history.

(56) References Cited

U.S. PATENT DOCUMENTS

| | | | | |
|---|---|---|---|---|
| 4,595,244 A | * | 6/1986 | Teramachi | 384/45 |
| 5,013,164 A | * | 5/1991 | Tsukada | 384/45 |
| 5,584,581 A | * | 12/1996 | Keller et al. | 384/45 |
| 5,930,898 A | * | 8/1999 | Lyon | 29/898.03 |
| 6,125,968 A | * | 10/2000 | Shirai | 384/13 |
| 6,461,046 B1 | * | 10/2002 | Kahl | 384/45 |
| 2003/0164264 A1 | * | 9/2003 | Luo | 184/5 |
| 2003/0185470 A1 | * | 10/2003 | Lee | 384/45 |
| 2004/0093970 A1 | * | 5/2004 | Iida et al. | 74/89.33 |

* cited by examiner

*Primary Examiner*—Thomas R. Hannon
(74) *Attorney, Agent, or Firm*—Leong C. Lei

(57) ABSTRACT

An improved structure of linear sliding rail circulating device is primarily composed of: a rail, which laterally forms a sliding path; a sliding base, which slides to operate along said rail, and is provided with an aperture at the interior for receiving the rolling elements; and combination ends, which are circulating system correspondingly formed subject to the H-shape or U-shape rail for connecting to the front and rear ends of the sliding base to serve as closes of the rolling path of the rolling elements and U turns for the rolling elements. Accordingly, rails of various types can be partially altered common components, thereby easing device maintenance and minimizing manufacture costs.

8 Claims, 23 Drawing Sheets

STRUCTURE OF LINEAR SLIDING RAIL CIRCULATING DEVICE

BACKGROUND OF THE INVENTION (a) Technical Field of the Invention

The present invention relates to a linear sliding rail circulating structure design, particularly to a sliding base, the components for the ends of which can be assembled by modules and altered to be applicable to extrusive or depressive rails, thereby having better resilience to ease manufacture of various type of linear sliding rail circulating devices.

(b) Description of the Prior Art

As shown in FIG. 1, a conventional linear sliding rail 10 structure is substantially composed of a rail 11 and a sliding base 12, which can slide along the rail 11. A groove is provided at the interior two sides of the sliding base 12 for receiving rolling balls (not shown), while the rear ends that the groove extends are sealed with ends 14, which are interiorly provided with an U-turn groove 121 for the rolling balls (not shown) to alter direction (also refer to FIG. 2). The outside of each end 14 is fastened to the sliding base 12 via an end cover 15, such that the rolling steel balls 131 will be closed in U-turn sliding path 121 formed between the sliding path 111 and the end 14 (as shown in FIG. 2). Furthermore, a sliding path 111 is laterally formed at the each side of the rail 11, and an object can be additionally installed in the retainer holes 16 of the sliding base 12. Driven by the sliding base 12, the object can make displacement along the sliding path 111 of the rail 11.

However, as the ends 14 of the above-mentioned linear sliding rail structure are integrally formed, the outline of the rim is strictly required to fit with the sliding path 111 of the rail 11, so that the sliding base 12 can smoothly move on the rail 11. In view of this, in order to avoid inaccuracy in size for assembly, there exists difficulty in enhancing the precise size at the time of manufacture.

As shown in FIG. 2, the perfect design for a conventional linear sliding rail is that the ends 14 and rail 11 keep an appropriate gap distance a. However, if the gap distance a is too great, the rolling element 13 will easily detach due to the gap distance a, thus reducing the manufacture benefit.

As shown in FIGS. 3 and 4, the above-mentioned rolling elements 13 are composed of a chain 133 and pluralities of rolling steel balls 131. Pluralities of partition pieces 132 are provided in the chain 133 and spaced away from one another in a certain distance, which is filled in with a rolling steel ball 131. As the cross-section of the chain 133 appears an inverted arc 134, when the chain 133 is curved in the ends 14, the area of the inverted arc 134 would become smaller and be easily cracked due to external destructive power.

As shown in FIG. 5, showing another type of convention linear sliding rail 10, as the design of the rail 11 appears a U outline, the manufacture thereof needs to re-mold subject to various rails, in order to fit the sliding 12 and ends 14. A roller bolt 17 is installed at a positioning portion 18 to serve as a conveying device. However, as there exists problem in the gap between said rail 11 and sliding base 12, the manufacture costs would be considerably increased.

Accordingly, the research motion of the inventor is to provide an improvement of the linear sliding rail circulating device.

SUMMARY OF THE INVENTION

The primary object of the invention is to provide a linear sliding rail circulating device, which is applicable to various rails, changeable with end components, assembly-exchangeable with common fittings, and therefore efficiently reducing the manufacture costs.

Another object of the invention is to provide an end component structure, which can efficiently and appropriately control the issue in gap, be easily produced, and be efficient in manufacture cost and time.

To achieve the above objects, the invention is primarily composed of a rail, a sliding base, ends, a rolling element, a sustainer, an anti-dust cover, etc. Said ends can be freely assembled and are each composed of a middle end block, a left end block and a right end block, which can be engaged and combined with each one another before being fastened to the front and rear ends of the sliding base. Besides, said end blocks can have the cross-section in form of an H or a recessive U, in order to alter the pattern of the laterally corresponding sides in the aperture of the rail sliding path. As such, common fittings can be applicable to partial structure of various rails, thus ease maintenance and curtail manufacture costs.

Meanwhile, in view of the fact that the design of the chain of the rolling element presents a multi-angle saddle, and that the wings of the rolling element can have an arrangement of different vertical-central lines, the rolling element can be applicable to recessive U-type rail sliding device, thus reducing the manufacture costs.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 6:
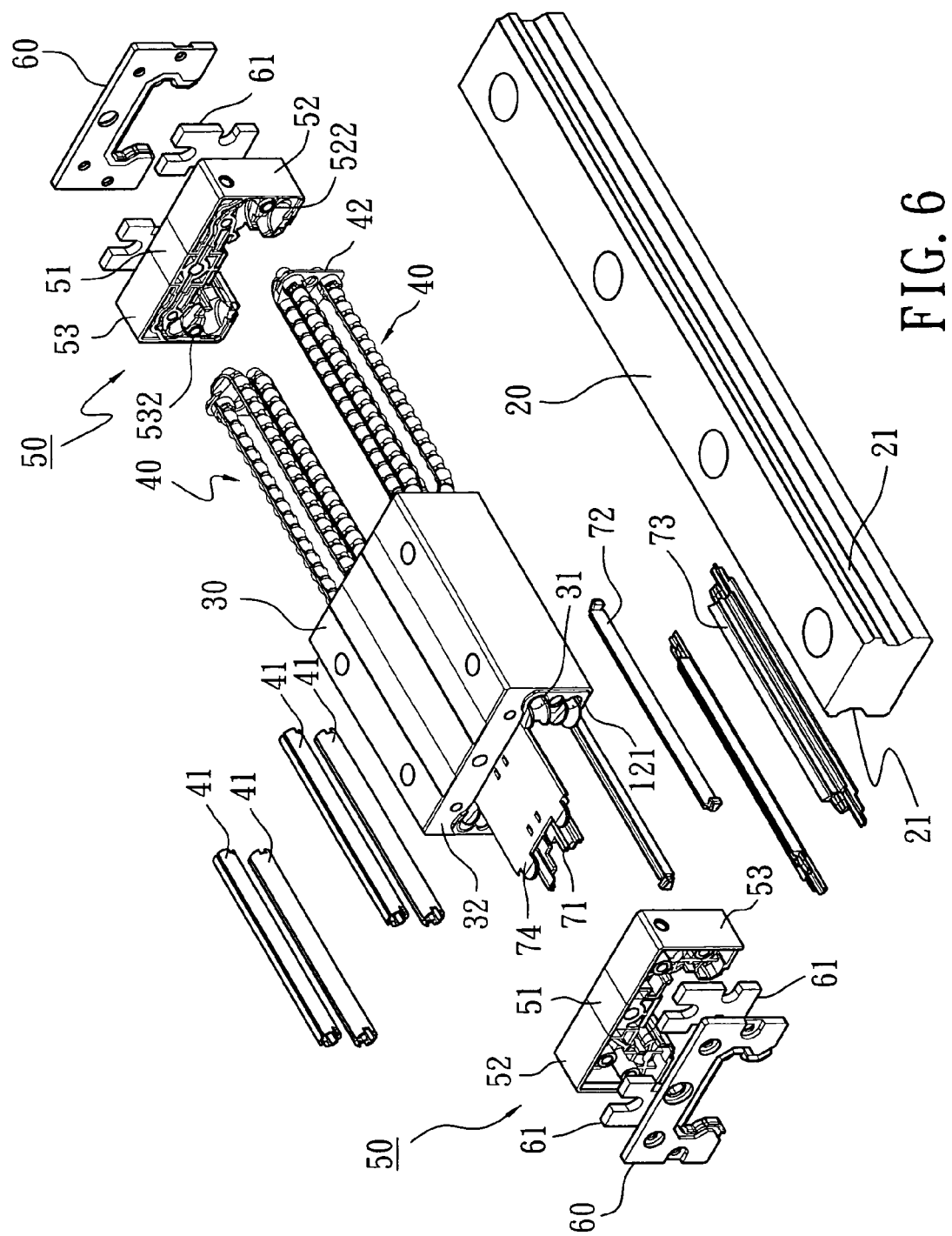
FIG. 6 is an exploded view of a preferred embodiment according to the present invention.

Referring to FIG. 6, the linear sliding rail circulating device is provided with a rail 20, a sliding base 30, two rolling elements 40, two ends 50 and two anti-dust covers 60.

The outline of the rail 20 appears as an H and is laterally formed with sliding paths 21 at two sides, such tat the sliding base 30 can slide along the rail 20. The sliding base 30 is provided wit rolling elements 40 inside and apertures 31 at the interior walls for receiving the rolling elements 40, which therefore can slide between the sliding paths 21 and the apertures 31, and subsequently drive the sliding base 30 to operate on the rail 20. An end member 50 is combined at each end of the aperture 31 and serves as a U-turn pat for the rolling elements 40. The end member 50 is fastened to the sliding base 30 by the middle end block 51. An oil-moistened cotton 61 is provided between the middle end block 51 and the anti-dust cover 60 for lubricating the rolling elements 40 to allow smooth operation.

Figure 1:
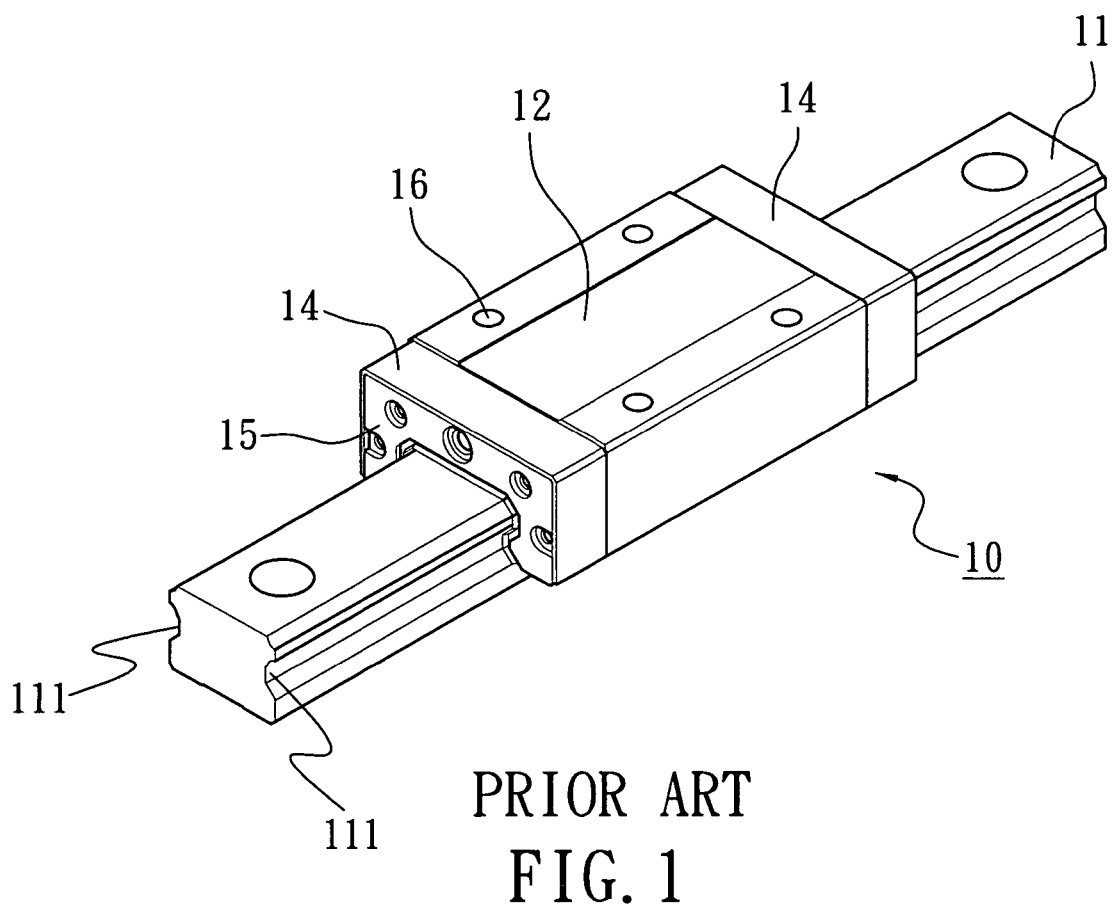
FIG. 1 is a perspective view of a conventional linear sliding rail structure.
Figure 2:
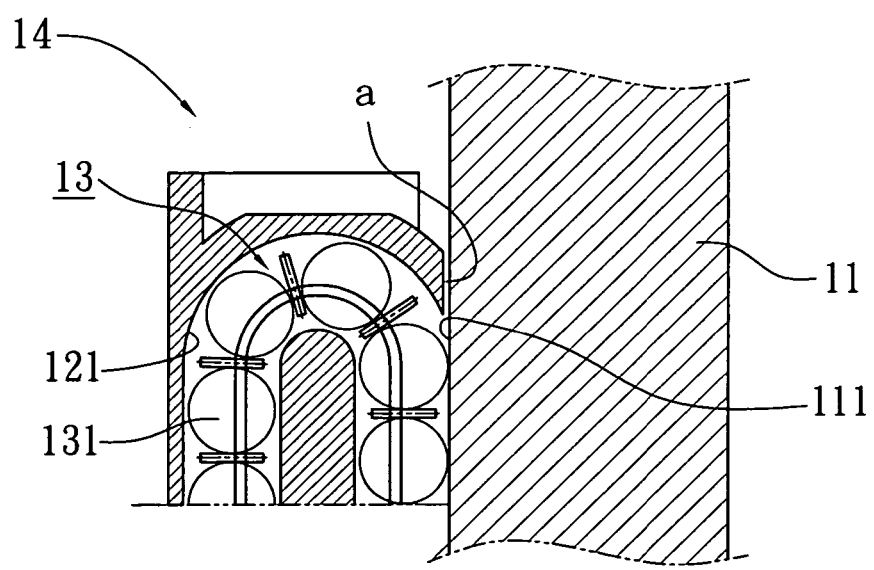
FIG. 2 is partially cut-away view of a conventional linear sliding rail structure.
Figure 7:
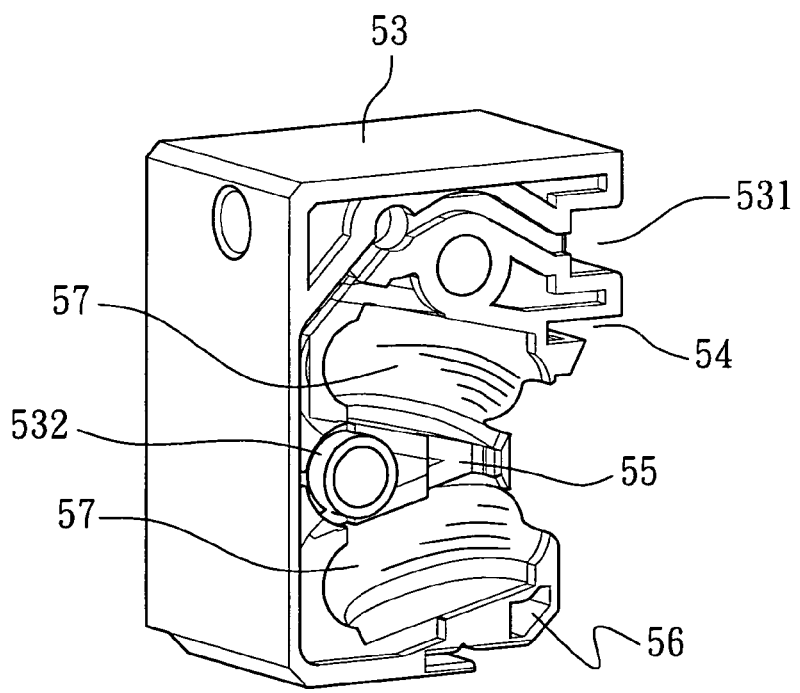
FIG. 7 is a perspective view of a right end block according to the invention.
Figure 8:
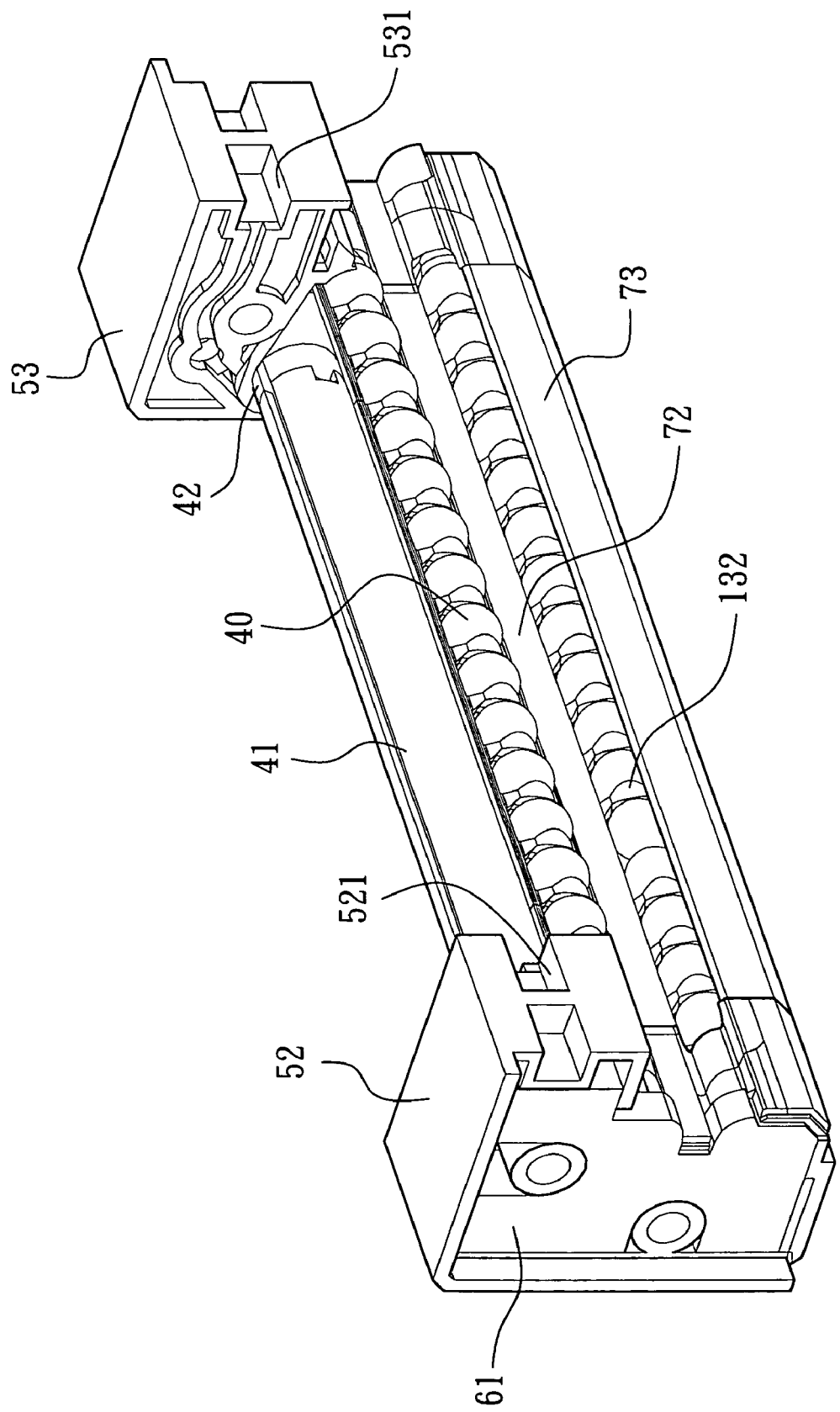
FIG. 8 shows the combination of the left and right end blocks and the rolling elements.
Figure 9:
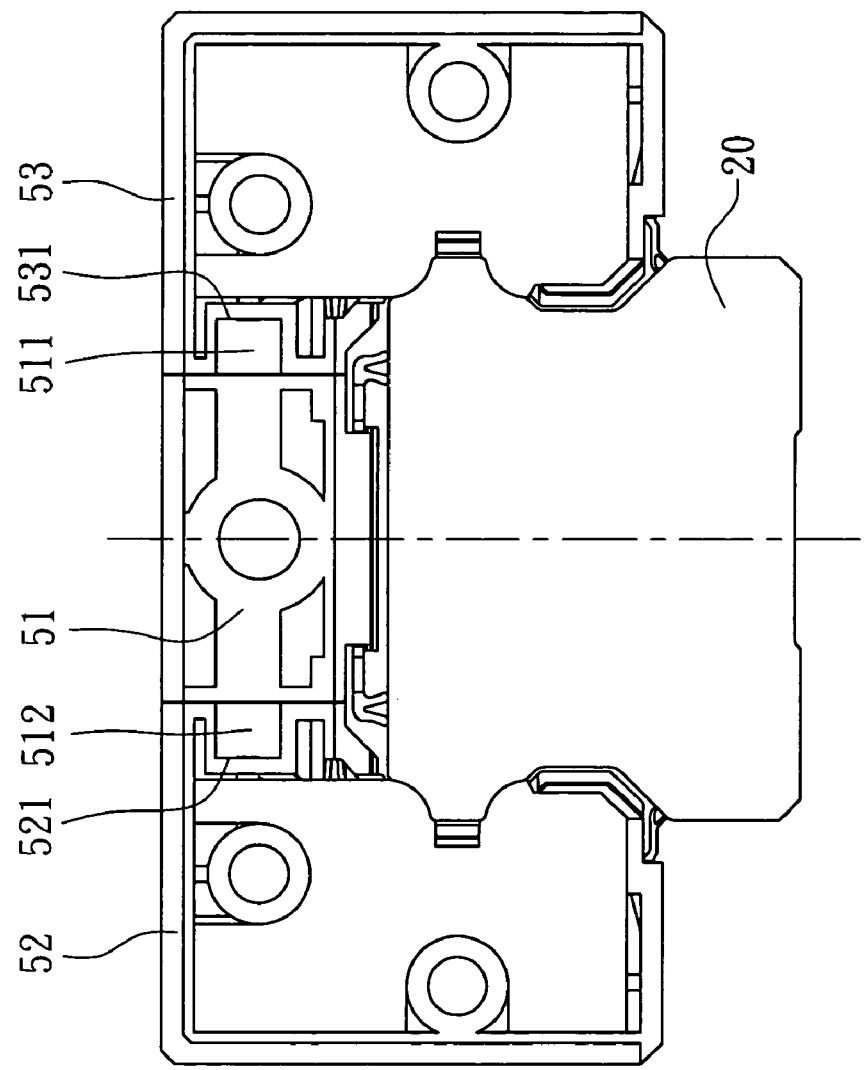
FIG. 9 is a cross-sectional view showing the combination of the end and the rail according to the invention.

Further referring to FIG. 6, each of the end members 50 includes a middle end block 51 and a left end block 52 and a right end block 53 corresponding to each other. The end members 50 are combined to the vertical surface 32 of the front and rear ends of the sliding base 30. Referring to FIGS. 7, 8 and 9, while extrusive ribs 511, 512 are formed at the two sides of the middle end block 51, clamping frames 521, 531 can be formed at the left end block 52 and the right end block 53, respectively, for clamping said ribs 511, 512. By way of threads, the middle end block 51 can be fastened to the sliding base 30, whereas the left end block 52 and right end block 53 can be engaged in a circulating strip 42 by positioning posts 522, 532 (as shown in FIG. 7), further engaged in the sliding base 30 (as shown in FIG. 2), and then, by way of threads, along with the anti-dust cover 60 fastened to the front and rear ends of the sliding base 30. Recessive U-turn paths 57 correspondingly match the aperture 31 of the sliding base 30 are provided at the inner rim of the left end block 52 and right end block 53, in order to provide a guide for the rolling elements 40.

By way of the above structure, the middle end block 51 can be combined to the vertical surface 32 of the sliding base 30 (as shown in FIGS. 6 and 9). The left end block 52 and the right end block 53, having a size adopted to the width of the rail 20, are combined to the ribs 511, 512 at the two sides of the middle end block 51, such that whenever the fittings of the ends 50 require exchange, only the damaged fittings should be exchanged alone (possibly only one of the middle end block 51, the left end block 52 and the right end block 53), thereby easing maintenance and curtailing costs.

Figure 10:
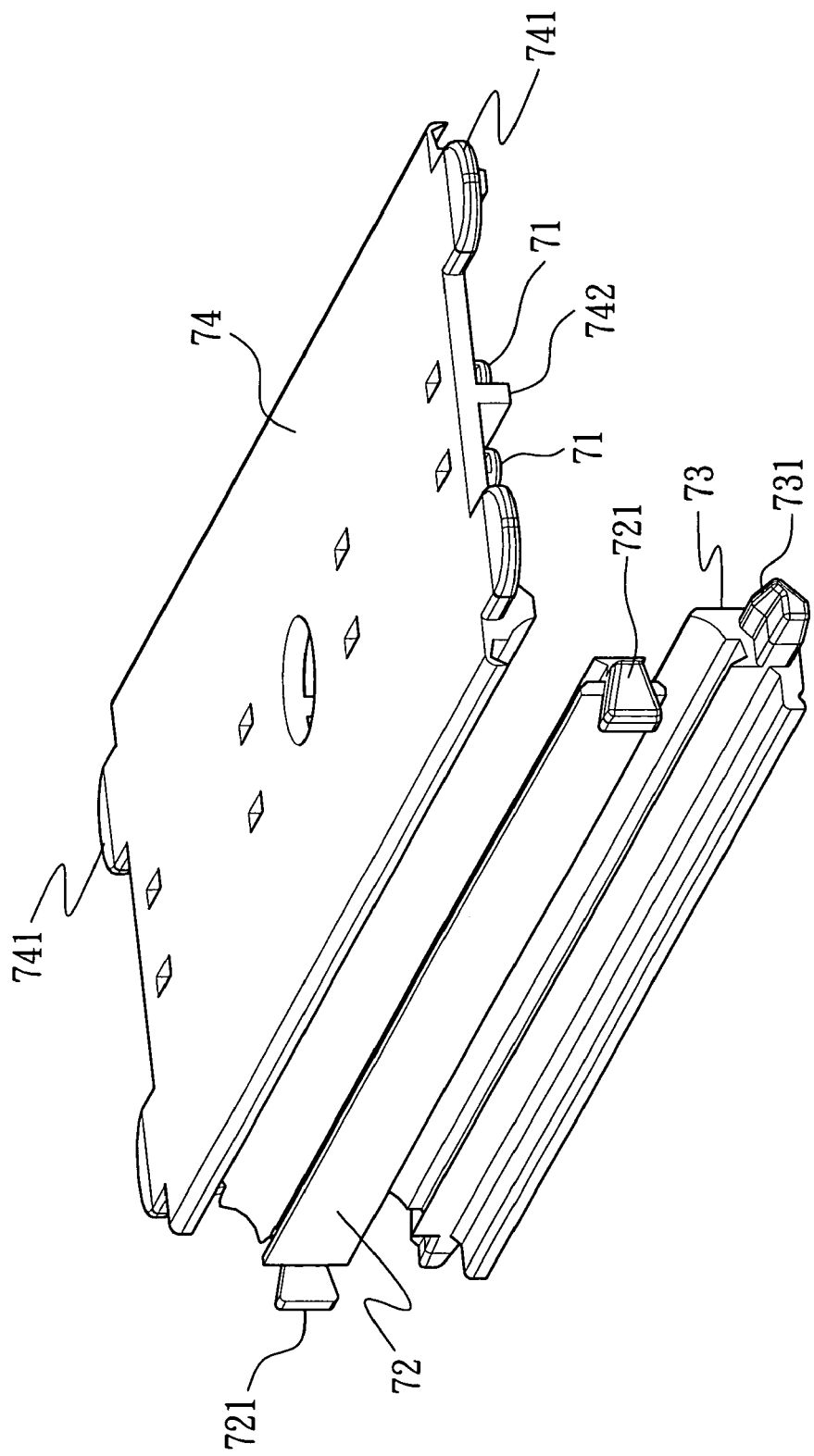
FIG. 10 is an exploded view of the sustainer of the invention.
Figure 11:
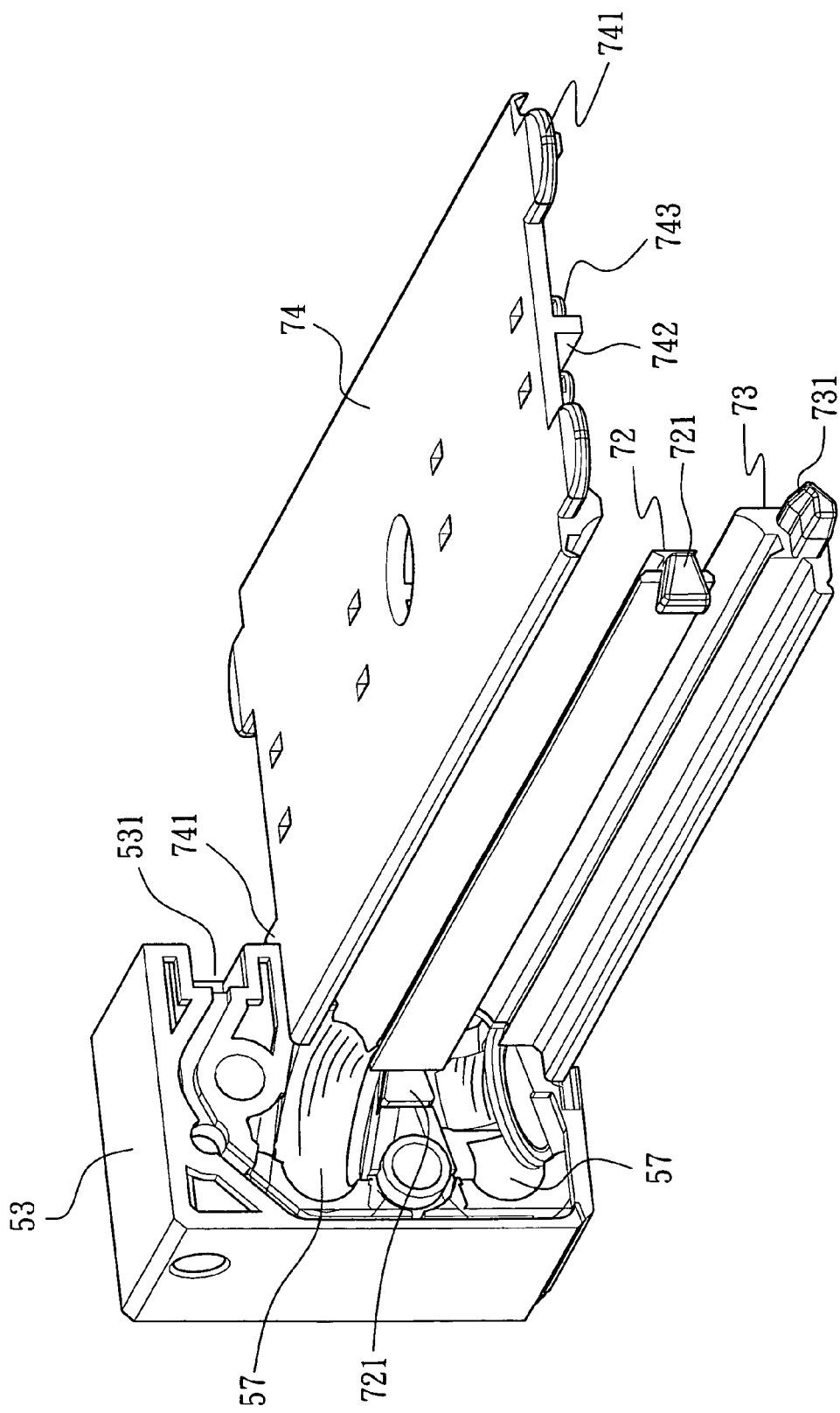
FIG. 11 is an exploded view showing the combination of the sustainer and the left end block.

Referring to FIGS. 6 and 10, regarding the relations between the sliding base 30 and rail 20, an upper sustainer 74 is provided at the top of the hollow of the sliding base 30, and a middle sustainer 72 and a lower sustainer 73 are provided at the sides of the hollow, thereby avoiding the rolling elements 40 from dropping out of the aperture 31 at the time of rolling. Upper anti-dust strips 71 are adhered to the lower rim of the upper sustainer 74 for preventing dust from permeating into the apertures 31 and the sliding paths 21 to affect the smoothness of the rolling balls. Insertion pieces 741, 721 and 731 are formed at the sides of the upper sustainer 74, middle sustainer 72 and lower sustainer 73, respectively, while engaging grooves 54, 55 and 56 (as shown in FIG. 7) corresponding to said insertion pieces 741, 721 and 73 are provided at the left end block 52 and right end block 53, respectively, thereby engaging with and fastening to each other (as shown in FIG. 11).

Figure 12:
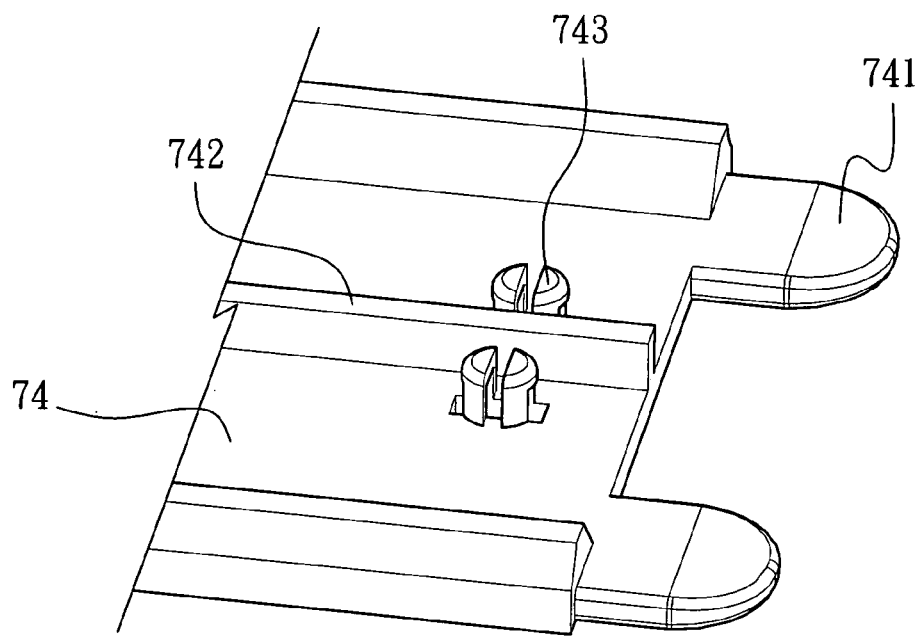
FIG. 12 is a perspective view of the upper sustainer.
Figure 13:
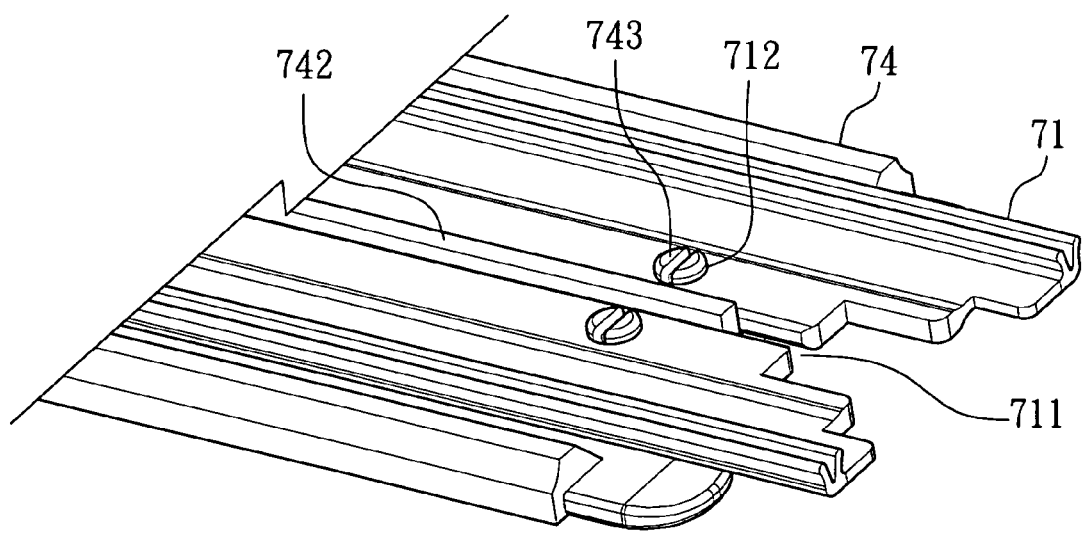
FIG. 13 partially shows the combination of the upper sustainer and an upper anti-dust strip.

As shown in FIGS. 12 and 13, the upper sustainer 74 is provided at the central bottom with a partition strip 742, which is provided with a positioning post 743 at each side. The upper anti-dust strip 71 is provided with a furrow 711 corresponding to the partition strip 742 and positioning holes 712 corresponding to each other. The furrow 711 and the position holes 712 are engaged and positioned with the partition strip 742 and the positioning posts 743, respectively.

Figure 14:
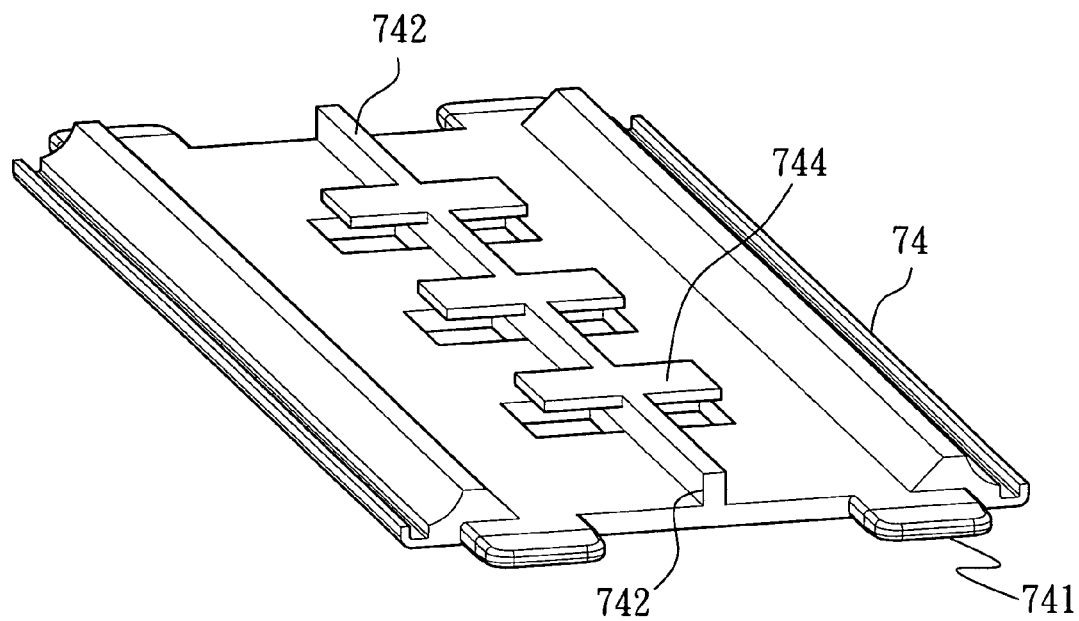
FIG. 14 is an enlarged view of the upper sustainer according to another embodiment of the invention.
Figure 15:
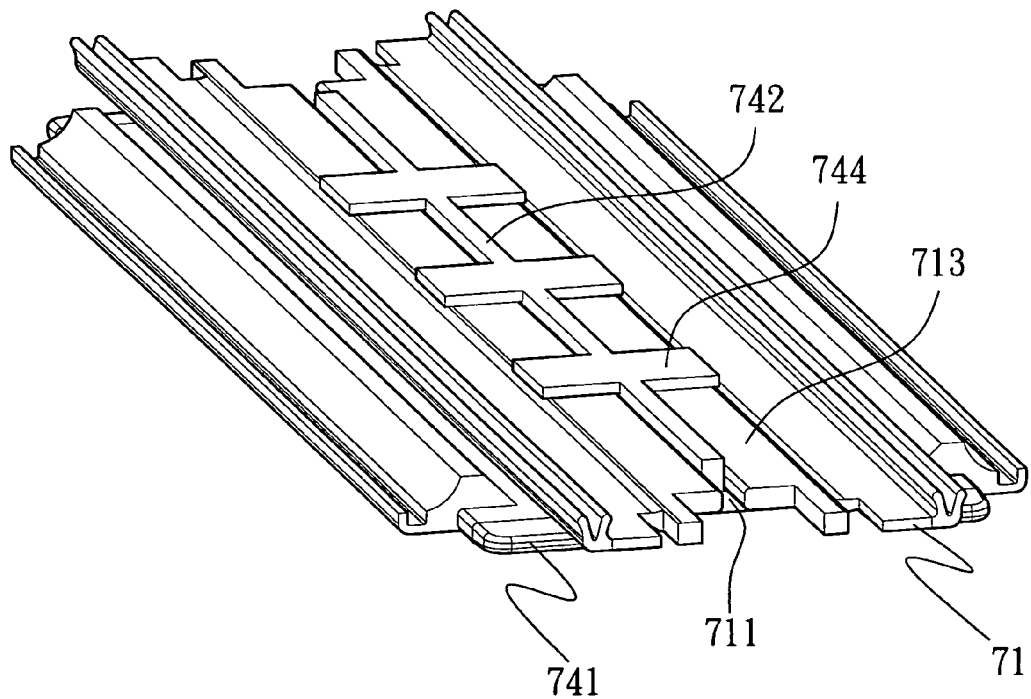
FIG. 15 partially shows the combination of the upper sustainer and the upper anti-dust strip according to another embodiment of the invention.

Referring to FIGS. 14 and 15, showing another embodiment of the invention, the upper sustainer 74 is likewise provided at the central bottom with a partition strip 742, along which is laterally provided with corresponding splints 744 at the upper and lower sides, therefore, by way of the sheet 713 at the sides of the furrow 711, a formal anti-dust strip 71 can be engaged between the splints 744 (as shown in FIG. 15), in order to permit the upper sustainer 74 position with the upper anti-dust strip 71.

Figure 16:
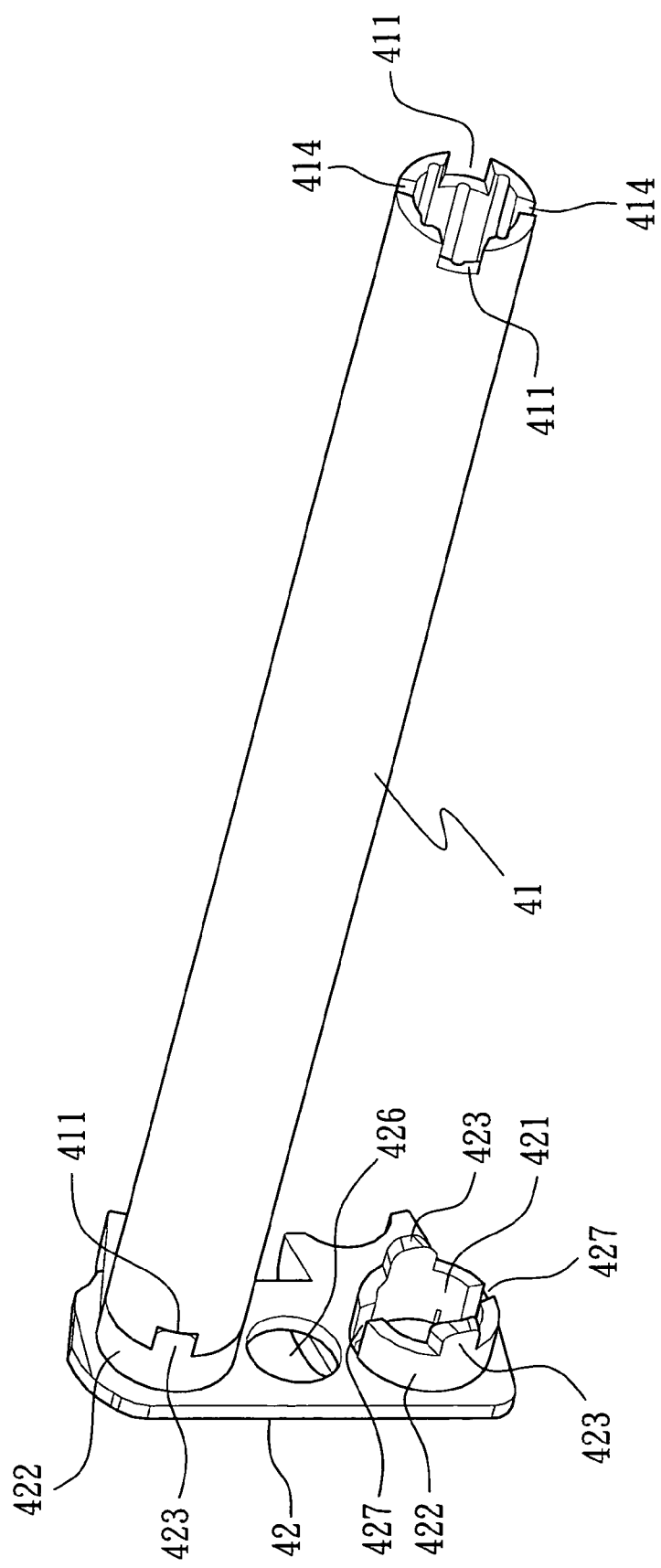
FIG. 16 partially shows the combination of the chain sleeve and the circulating partition.

As shown in FIGS. 6 and 16, the invention further comprises four chain sleeves 41 and four circulating partitions 42, wherein the chain sleeves 41 are used for inserting into the apertures 31 of the sliding base 30 for covering the exterior of the rolling elements 40. A circulating partition 42 is provided at each end of the chain sleeves 41 such that the circulating partitions 42 will be padded at the interior of the right end block 53 or left end block 52 (as shown in FIG. 6). Each of the circulating partitions 42 is provided at the upper and lower ends with respective guide holes 421 and extruding surrounding walls 422 which can be positioned in the apertures of the sliding base. Locking extrusions 423 are provided on the top of the surrounding walls 422, and by way of the combination of the locking extrusions 423 and the gaps 411 at the rear end of the chain sleeves 41, the guide holes 421 can be corresponded to the hole of the chain sleeve 41. Meanwhile, each circulating partition 42 is provided with through hole 426 to correspond to the aperture post 532 on the right end block 53 (as shown in FIG. 7) for the purposes of position. Accordingly, the guide holes 421 would correspond to the U-turn grooves 57 of the right end block 53 of left end block 52, thereby the rolling elements 40 can keep a constant circulating movement in the chain sleeves 41, the circulating partitions 42 and U-turn grooves 57.

Further referring to FIGS. 6 and 16, while each circulating partition 42 is provided at the upper and lower ends with respective extruding surrounding walls 422, the top of which is provided with openings 427, each chain sleeve 41 is correspondingly provided at the upper and lower ends with lateral openings 414, such that the openings 427 and lateral openings 414 will combine to form a groove for receiving and positioning the chain of the rolling element 40. After the guide holes 421 are engaged with the chain sleeves 41, they can efficiently isolate the rolling elements 40 from the apertures 31, in order to avoid steel power and the like from entering into the chain sleeves 41, and subsequently reduce friction and noise during operation, and enhance the smoothness of operation.

Figure 17:
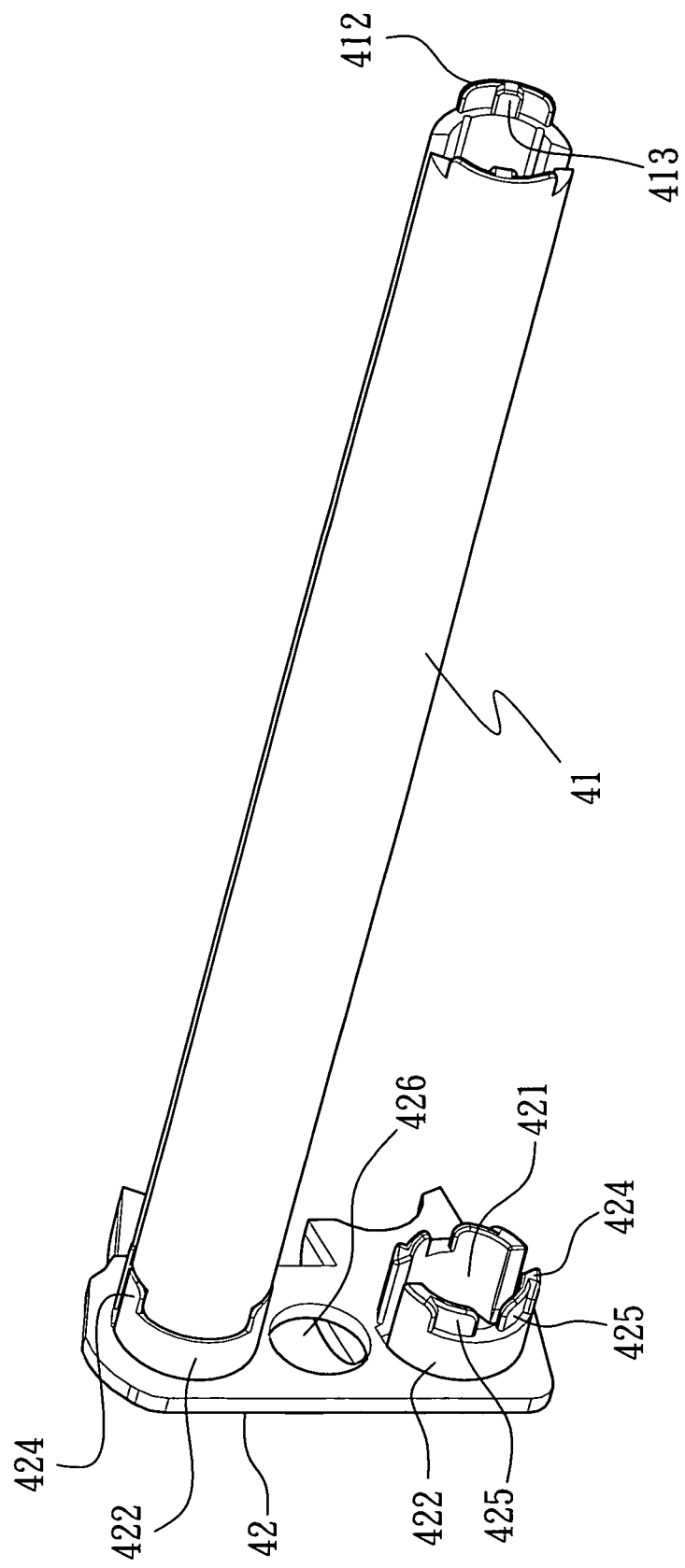
FIG. 17 partially shows the combination of the chain sleeve and the circulating partition according to another embodiment of the invention.

Now referring to FIG. 17, which shows another type of combination structure for the chain sleeves 41 and the circulating partitions 42. Clamping blocks 424 are provided at two sides of the surround walls 422 of the circulation partitions 42, while unconnected first thin walls 425 will extend inwardly between every two clamping blocks 424. The chain sleeves 41 are provided at the rim with second thin walls 412, the middle section of which is inwardly provided with a locking extrusion 413 for engaging and locking between the unconnected first thin walls 425, such that the second thin walls 412 and the first thin walls 425 will fill up with each other, i.e. the gaps on the surround walls 422, thereby the chain sleeves 41 and the circulating partitions 42 will combine with each other.

Figure 18:
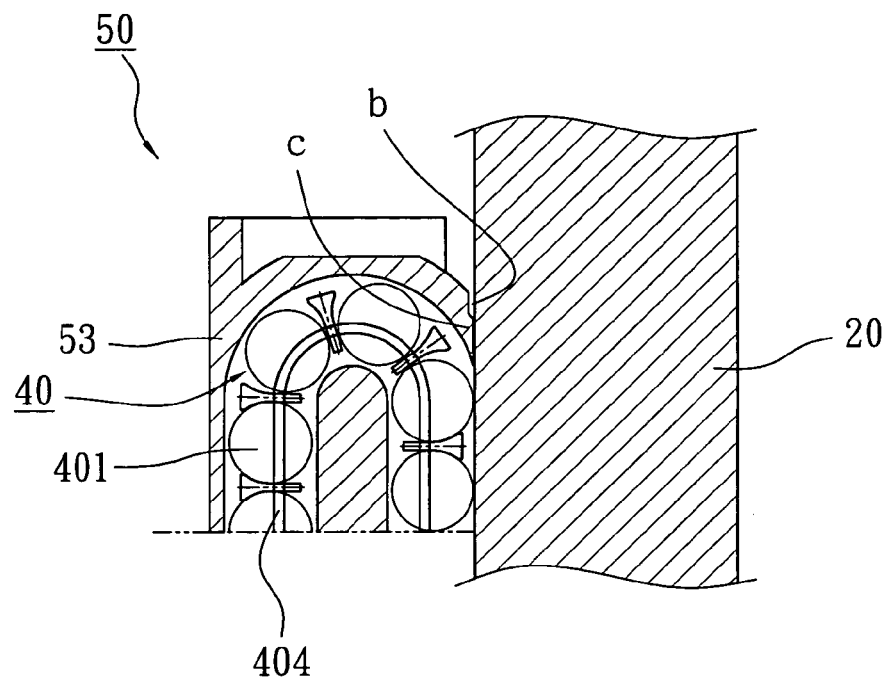
FIG. 18 is a cross-sectional view showing the rail and the right end block according to the invention.
Figure 19:
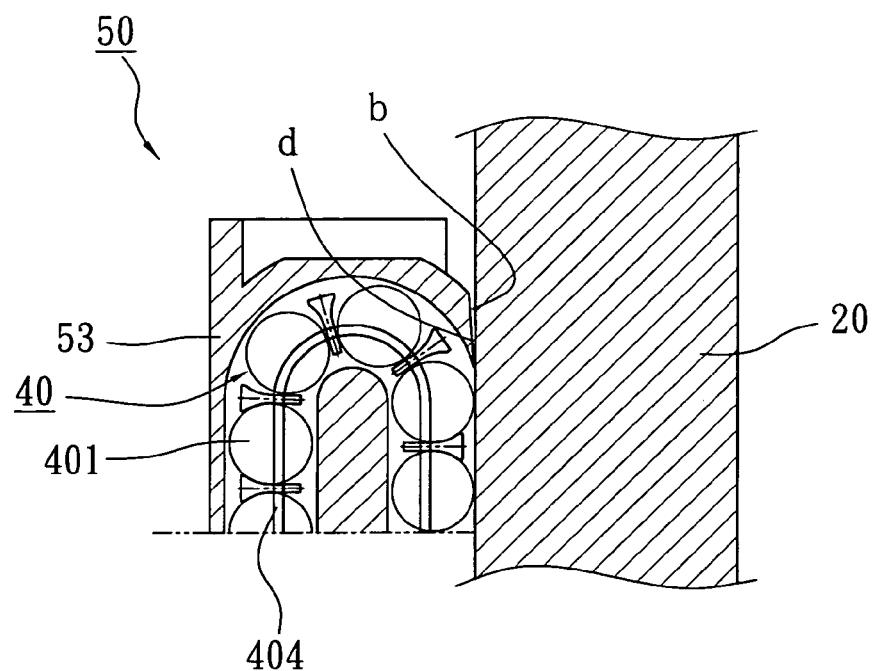
FIG. 19 is a cross-sectional view partially showing another type of rail and right end block according to the invention.

As shown in FIG. 18, an extruding step c is formed at the end 50 adjacent to the sliding rail 20. As such, the end 50 and the rail 20 can keep an appropriate distance b and can more appropriately lean against the rolling elements 40 to prevent them from detaching away from the rail. In addition, the extruding step c can alternatively be an inclined plane d (as shown in FIG. 19), thereby the appropriate gap distance b between the end 50 and the rail 20 would become closer and provide a better support for the rolling elements 40.

Figure 3:
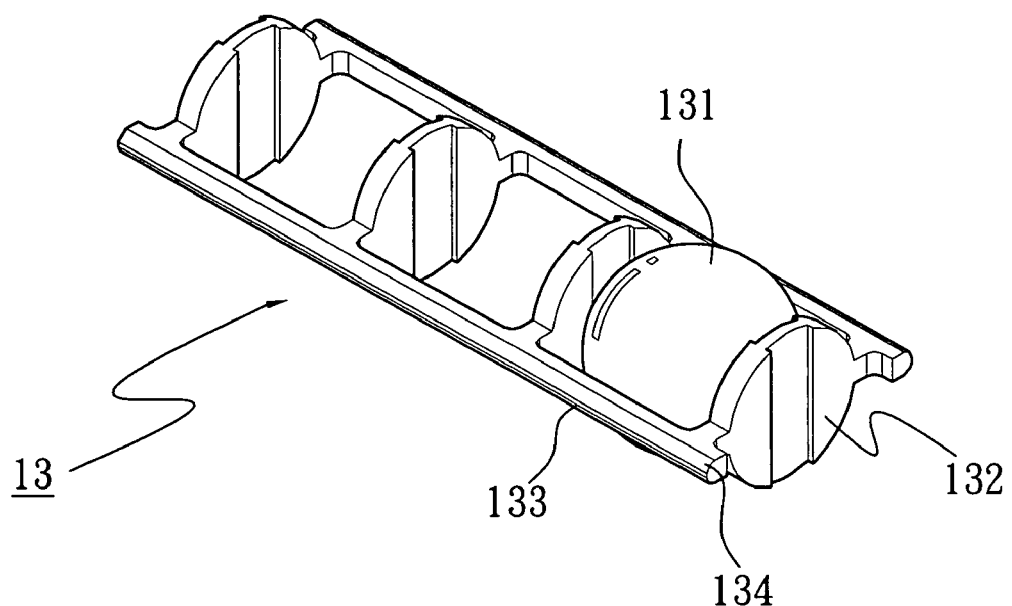
FIG. 3 is a perspective view of a rolling element for a linear sliding rail of the prior art.
Figure 4:
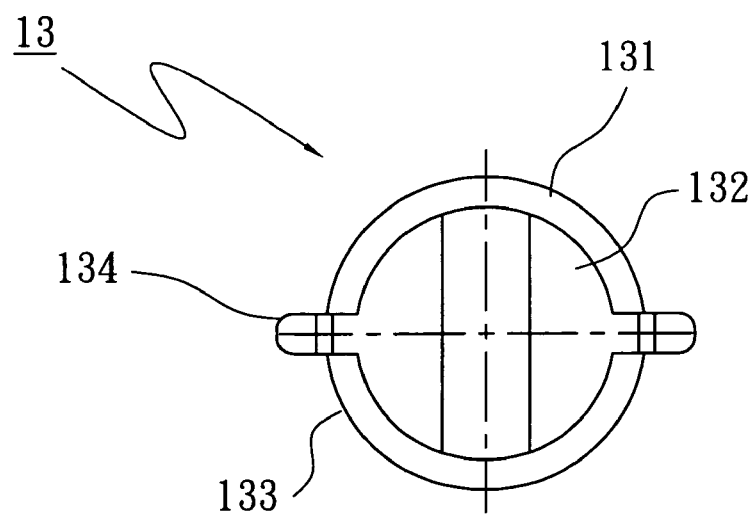
FIG. 4 is side view of a conventional rolling element.
Figure 5:
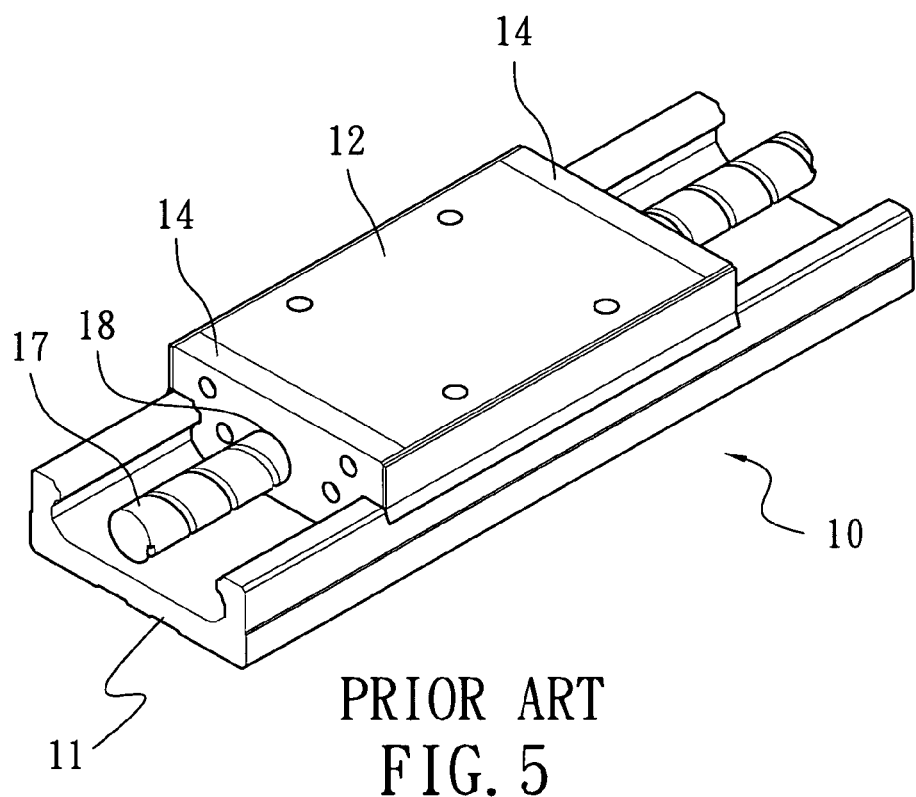
FIG. 5 is a perspective view of another type of linear sliding rail structure of the prior art.
Figure 20:
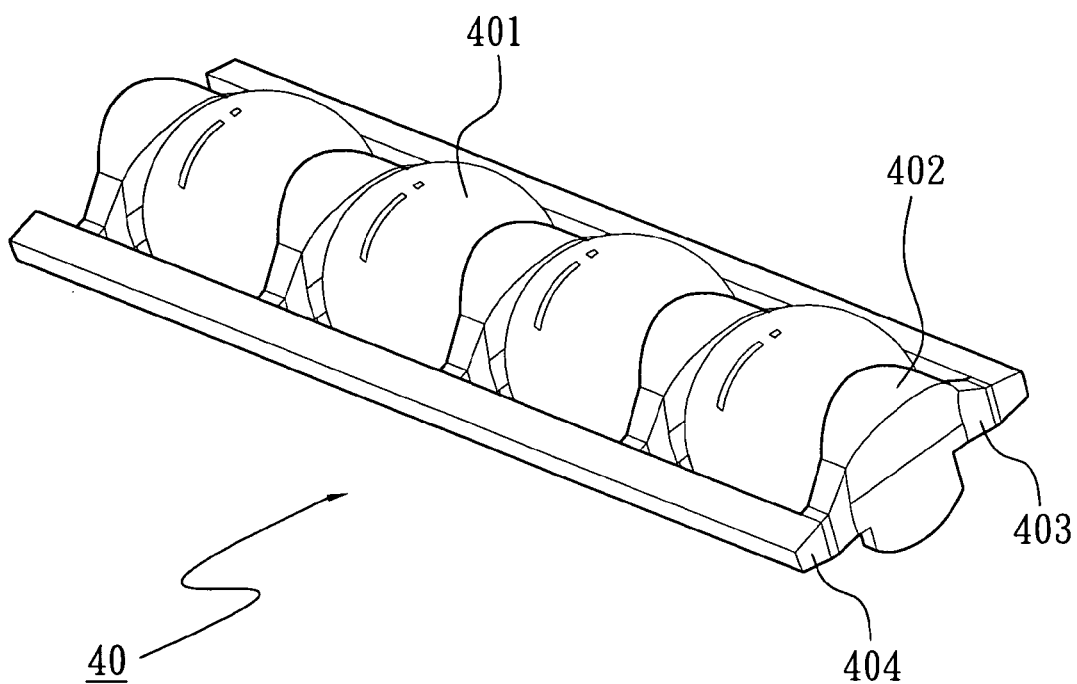
FIG. 20 is a perspective view of the rolling element.
Figure 21:
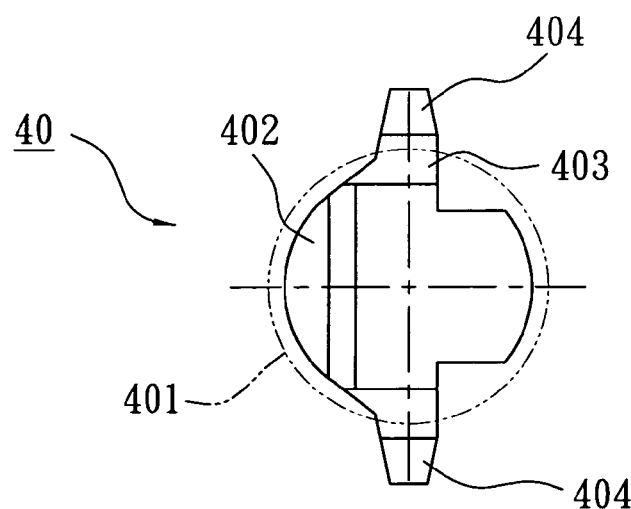
FIG. 21 is a side view of the rolling element.

Referring to FIGS. 20 and 21, the rolling elements 40 are composed of chains 430 substitutionally provided with pluralities of rolling balls 401 and partition pieces 402. The chain 403 has a cross section in the form of a multi-angle saddle with wings 404, the area of which is greater than the arc 134 of the conventional chain 133 (as shown in FIGS. 3 and 4), thereby increasing the strength of the chain 403 and partition piece 402.

Figure 22:
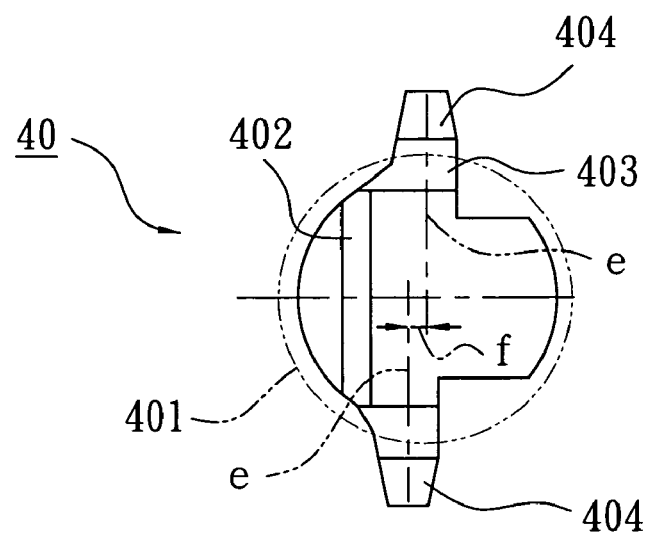
FIG. 22 is a side view of the rolling element according to another embodiment of the invention.
Figure 24:
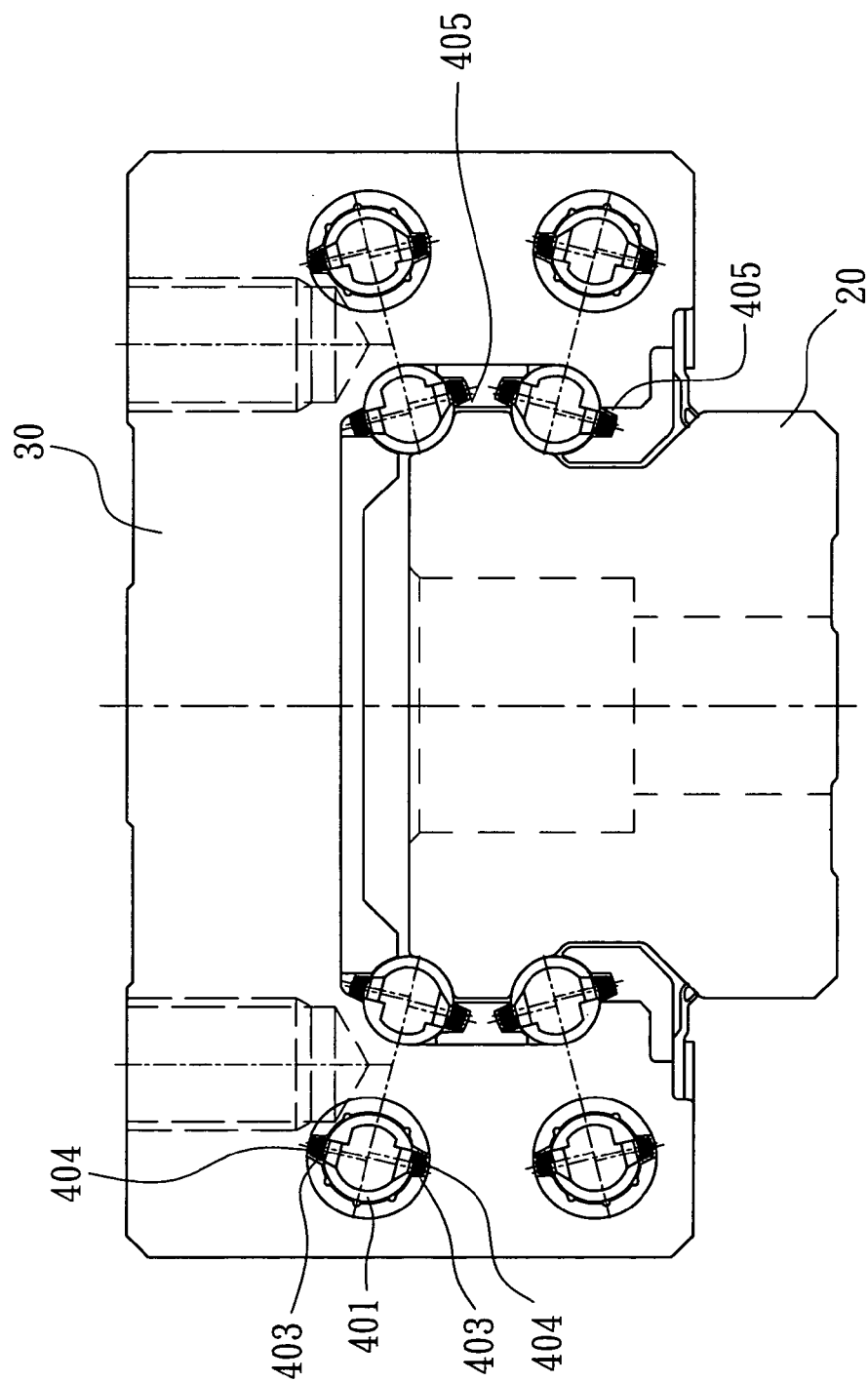
FIG. 24 is a side view showing the chain in FIG. 22 applied to the linear sliding rail.

As shown in FIG. 22, the wings 404 of the rolling elements 40 may have an arrangement of uncrossed vertical-central lines e, such that the wings 404 can, by way of the distance f between the central points of the uncrossed vertical-central lines e, provide more room for receiving the device to be installed on the sliding base 30 (as shown in FIG. 24). Concomitantly, the resistance of the wings 404 can be enhanced.

Figure 23:
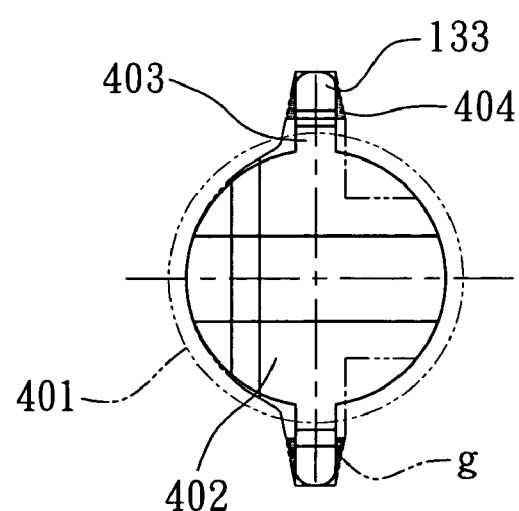
FIG. 23 shows a comparison in respect of the areas of the chain of the invention and that of the prior art.

As shown in FIG. 23, the wing 404 of the chain 403 has a cross-section in form of a multi-angle saddle, and therefore, the cross-section thereof would have an area g more than that of the prior art, rendering the curved portion more reinforced.

Figure 25:
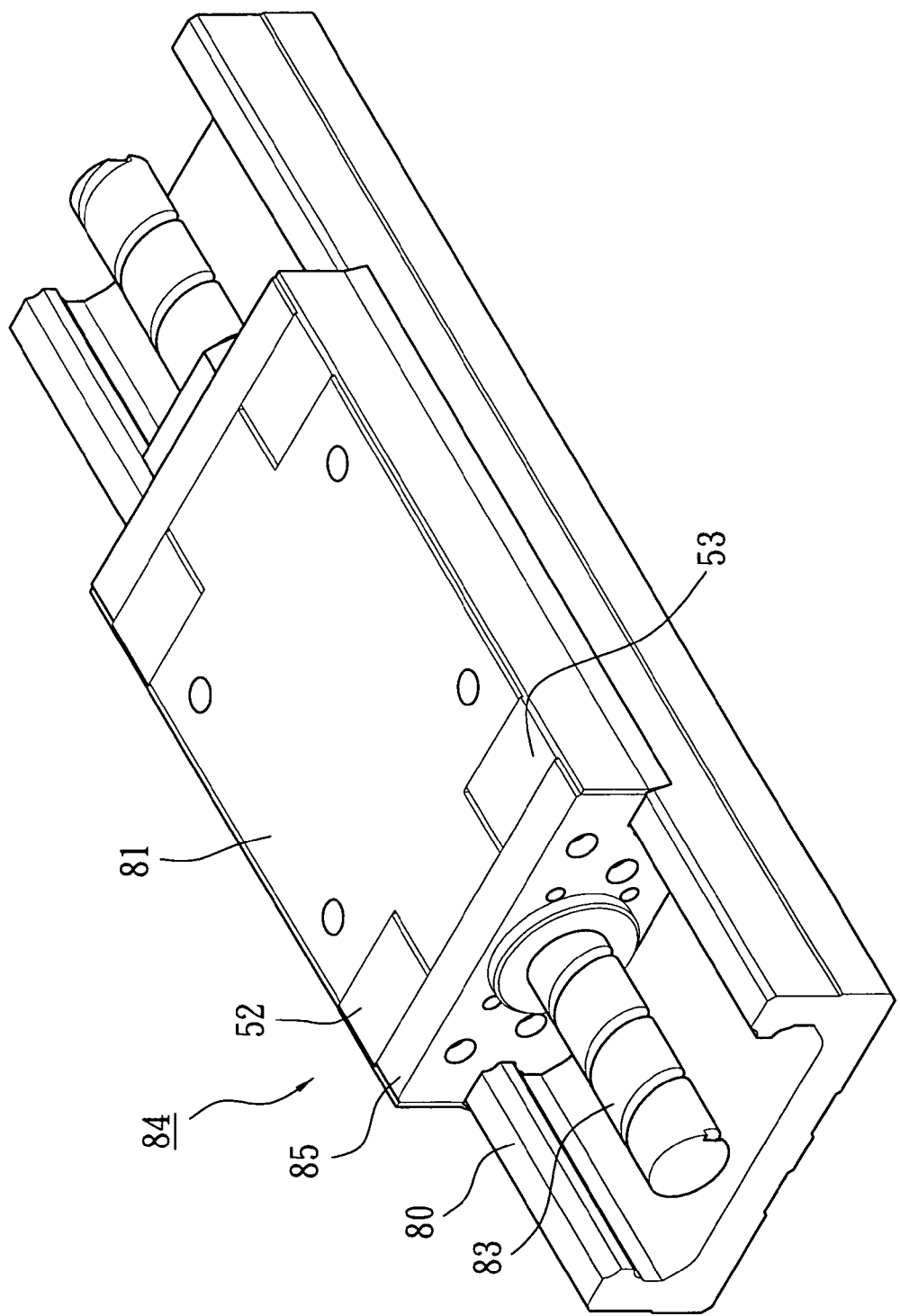
FIG. 25 is a perspective view of another type of linear sliding rail structure according to the invention.
Figure 26:
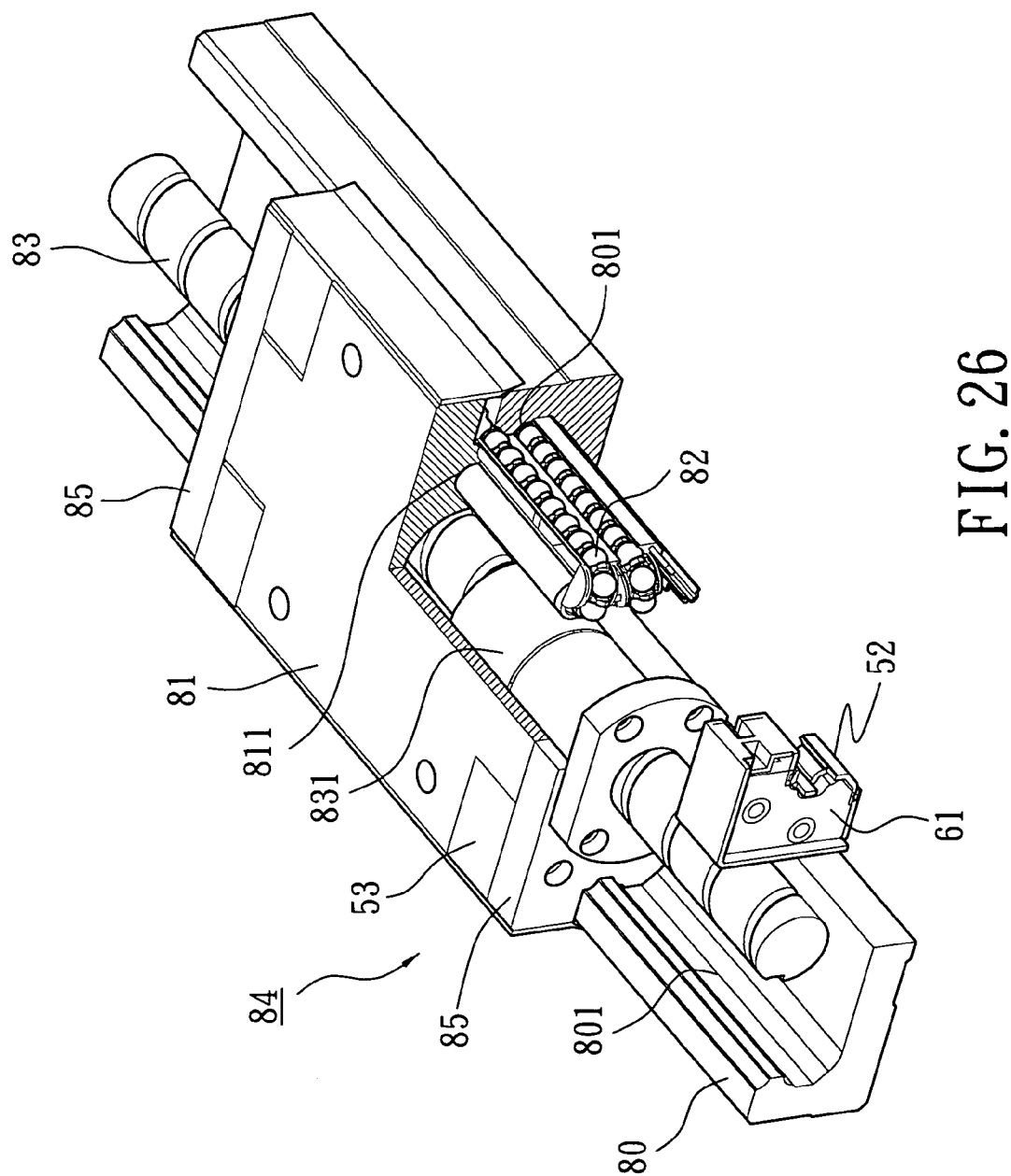
FIG. 26 is a partially cut-away view showing the linear sliding rail in FIG. 25.
Figure 27:
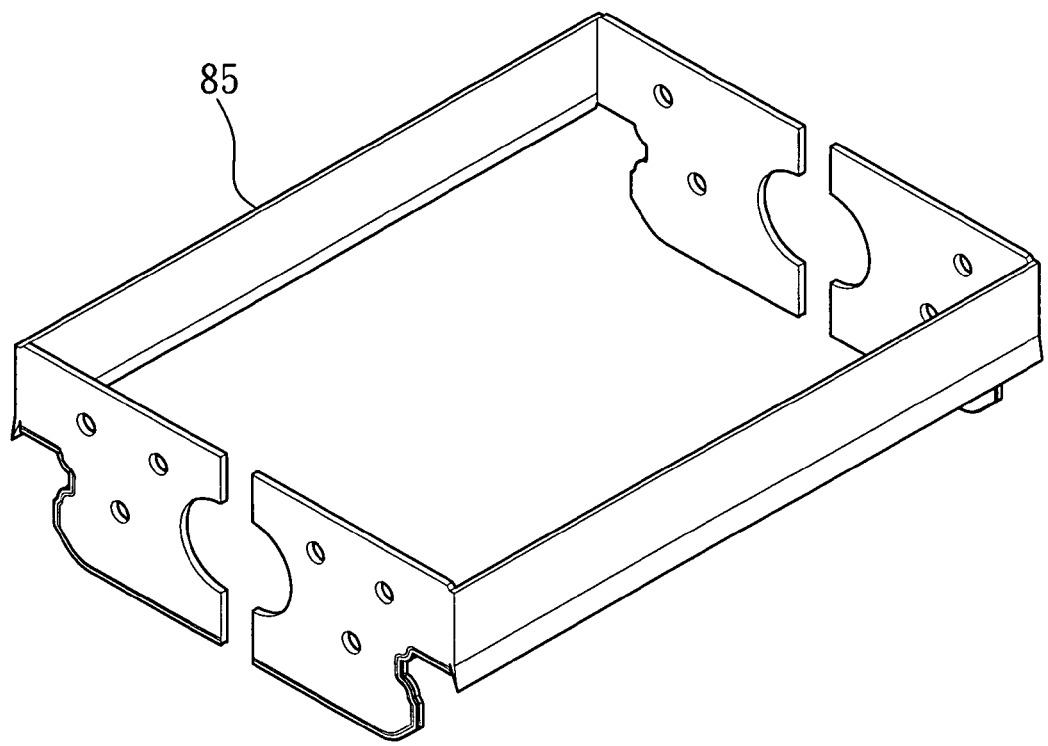
FIG. 27 is a perspective view showing the end of the linear sliding rail in FIG. 25.

Referring to FIGS. 25 and 26, which show another embodiment of the invention, the linear sliding rail is primarily composed of a U-shape rail 80, and a sliding base 80 sliding along the interior sides of the U-shape rail 80. The interior of the sliding base 80 can be provided with apertures 811 for receiving the rolling elements 82, and the center of the sliding base 81 is provided with a roller bolt 83 for driving the sliding base 81 to make replacement. Each of the apertures 811 is provided with two ends 84, the exterior of which is fastened to the sliding base 81 via an anti-dust cover 85 (as shown in FIG. 27). A sliding path 801 is laterally formed on the interior wall of the U-shape rail 80, while each end 84 can be combined by a left end block 52 and a right end block 53 (referring to FIG. 26).

Figure 28:
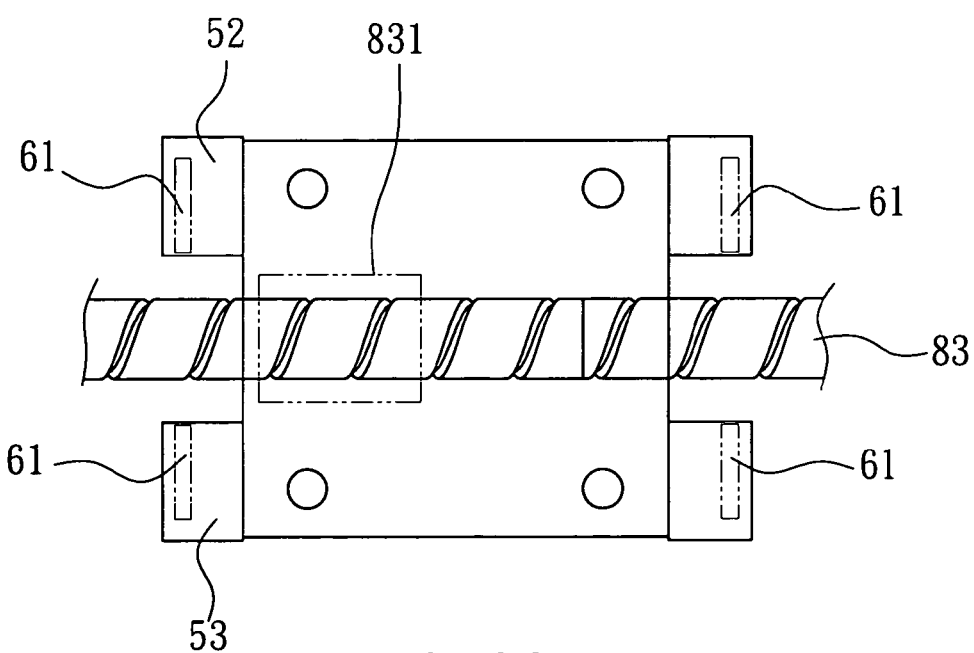
FIG. 28 is a top view of the linear sliding rail in FIG. 25.

Further referring to FIGS. 26 and 28, an oil-moistened cotton 61 is clamped by the end 84 and the anti-dust cover 85, such that when the rolling elements 82 can be lubricated when rolling inside the apertures 811, thereby the sliding base 811 can operate more smoothly. Besides, the oil-moistened cotton 831 can be surrounded over the roller bolt 83 for lubrication purposes.

Figure 29:
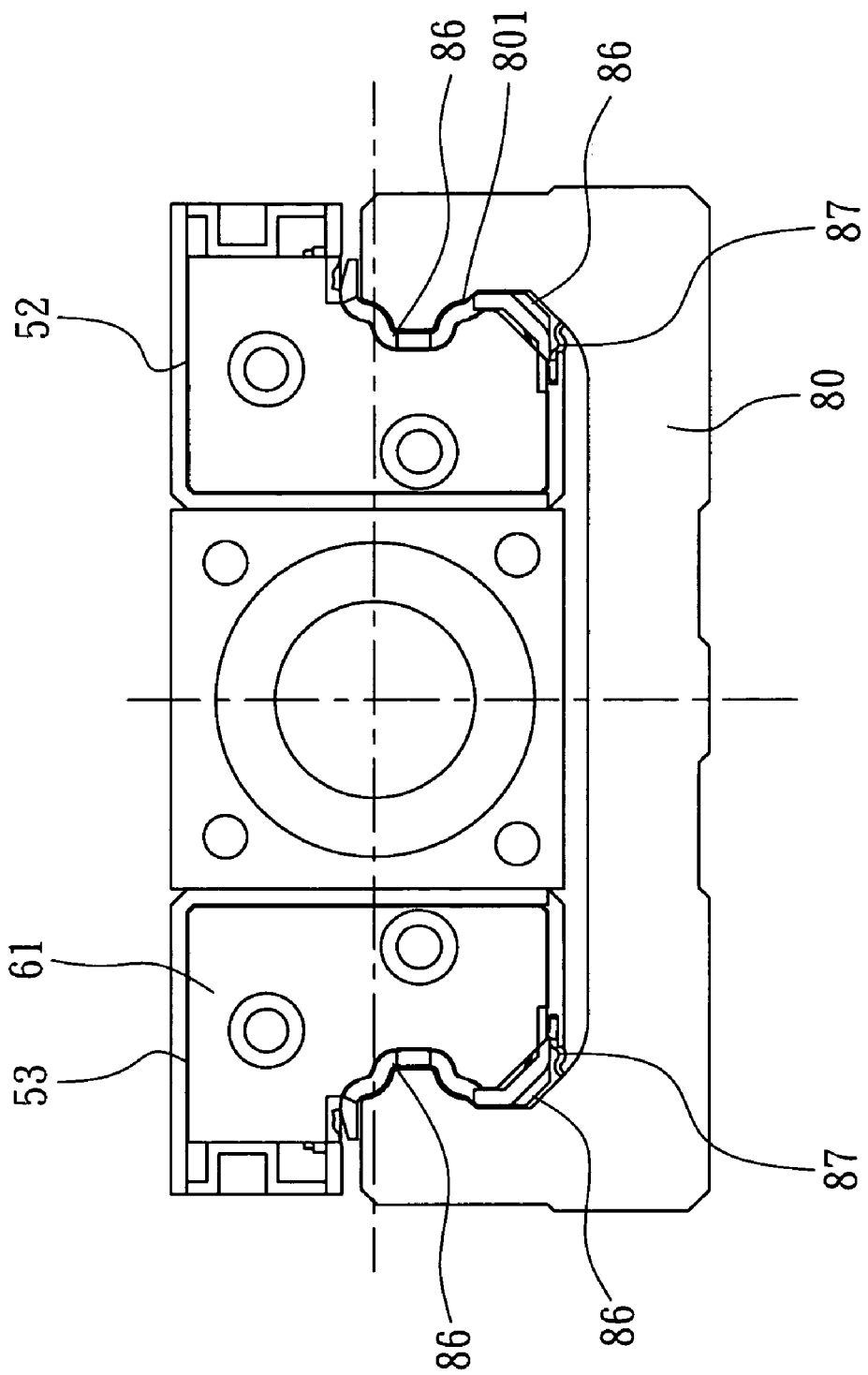
FIG. 29 is a rear view of the linear sliding rail in FIG. 25.

As shown in FIG. 29, while the rail 80 is in form of a U shape, the user can switch the position of the left and right end blocks 52, 53, such that the apertures originally corresponding to the sliding paths 801 of the rail 80 would turn outside. Furthermore, a sustainer 86 and an anti-dust strip 87 are provided on the contact surface between the U-shape rail 80 and sliding base 81. (As the structure of the ends, rolling elements and chain are substantially the same as aforementioned, descriptions thereof have been omitted to avoid redundant.) In view of the above, additional costs for making molds for new ends can be spared, and use of the device has become more flexible.

Figure 30:
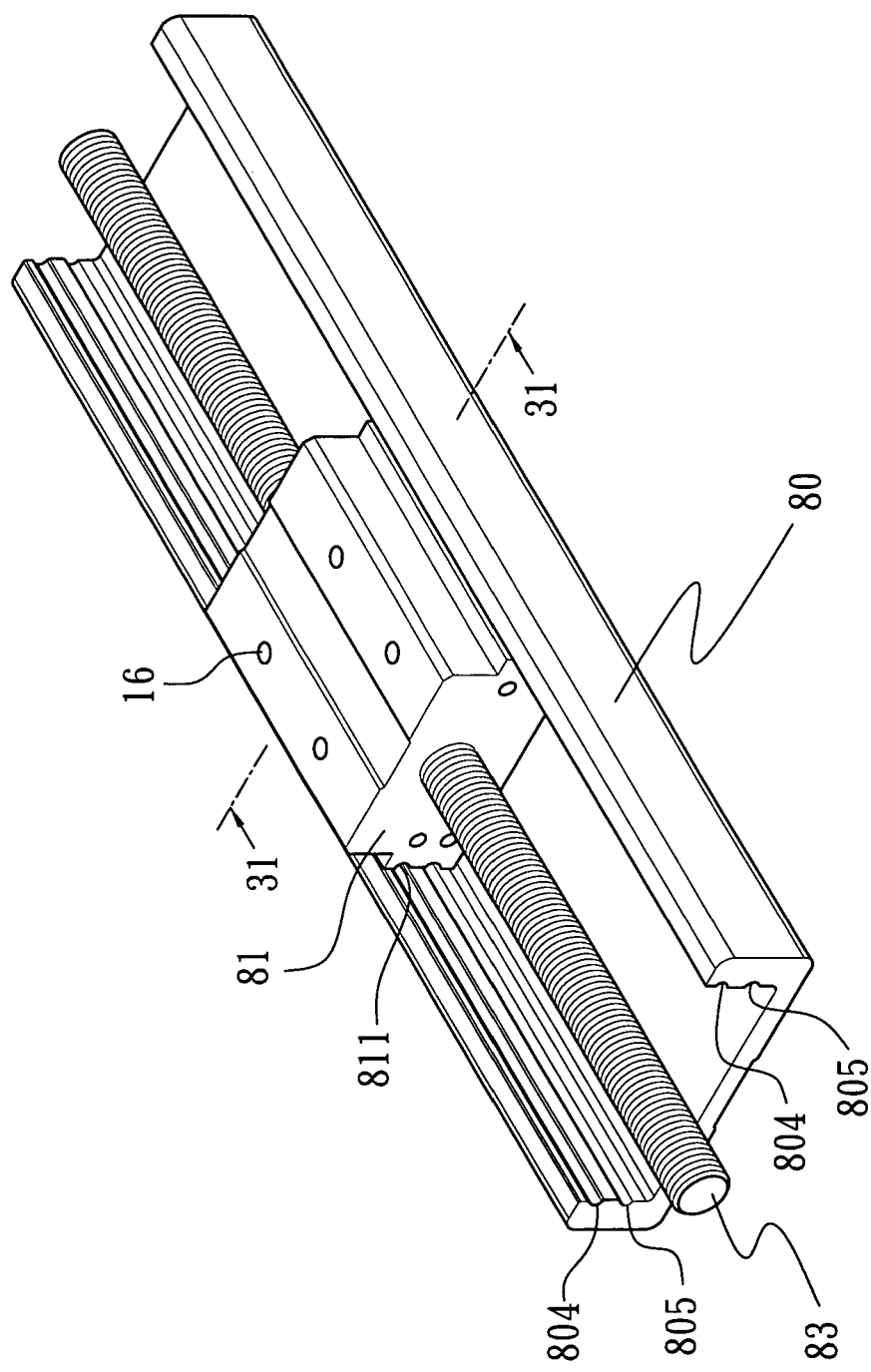
FIG. 30 is a perspective view of another type of linear sliding rail structure according to the invention.
Figure 31:
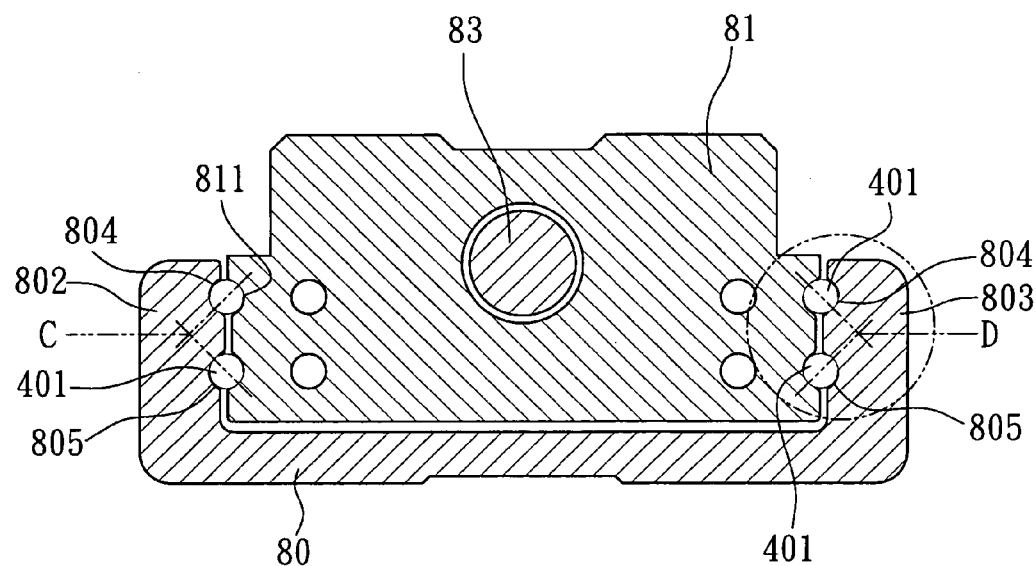
FIG. 31 is a cross-sectional view of the linear sliding rail structure in FIG. 30.

As shown in FIG. 30, when the linear sliding rail device is provided as being composed of a U-shape rail 80 and a sliding base 81, a rolling path for the rolling balls 401 would be formed between the apertures 811 outside of the sliding base 81 and the sliding paths inside of the U-shape rail 80. And a first sliding path 804 and a second sliding path 805 (as shown in FIG. 31) will be formed at the two interior walls 802, 803 corresponding to the sliding base 81. Each side of the first sliding path 804 and second sliding path 85 is provided with rolling balls 401. Retainer holes 16 are provided on the top of the sliding base 81 for positioning the carried article. A roller bolt 83 is provided at the center of the sliding base 81, such that the sliding base 80 can be guided by the rolling balls 401 and makes linear movement along the first and second sliding paths 804, 805 between the U-shape rail 80 and the sliding base 81.

Figure 32:
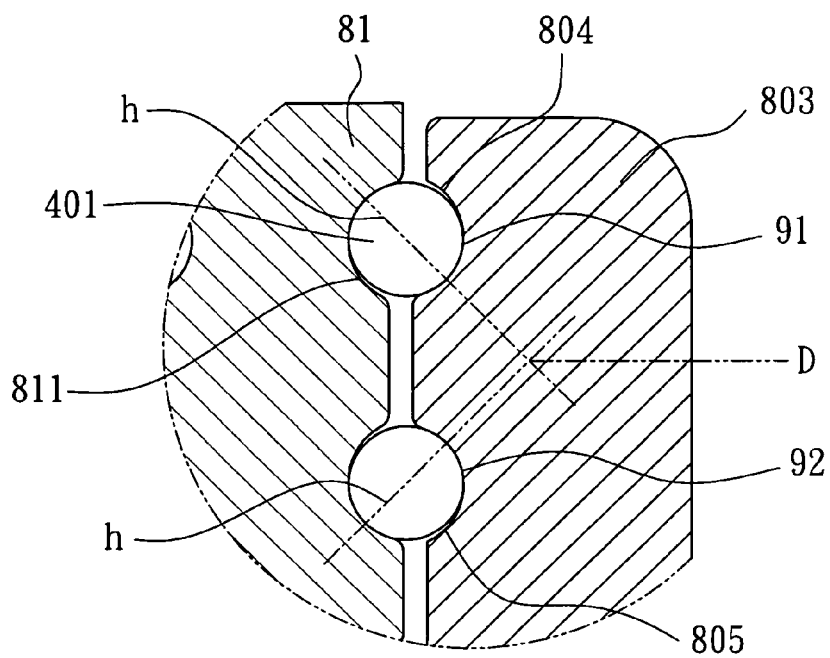
FIG. 32 is a partially enlarged view of the linear sliding rail structure in FIG. 30.

Now refer to FIG. 32, as clearly reflected in the partially enlarged view, when the rolling balls 401 are rolling in the first sliding path 804 or the second sliding path 805, and clamped to roll between the sliding paths and the apertures, a first contact arc 91 and a second contact arc 92 will form at the interior groove arc and the contact arc, respectively. Two link lines h extending from the arc through the center of two rolling balls would cross and form a bevel angle. The two link lines h intersect at the interior of the sidewalls 802, 803, so that the supporting intersection points C, D (as shown in FIG. 31) will be formed, thereby forming a better torque load for the two sides of the U-shape rail 80 and the sliding base 81.

Figure 33:
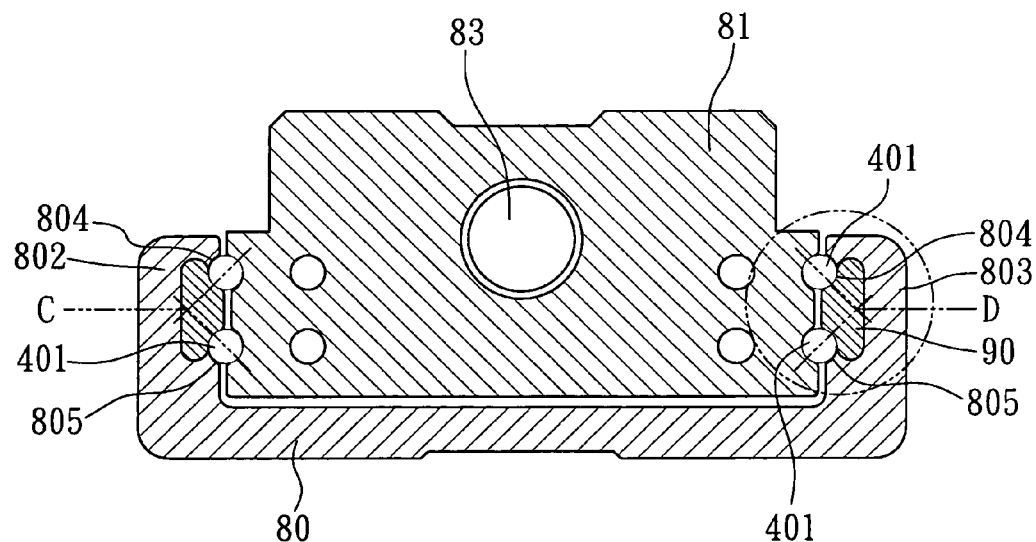
FIG. 33 is a cross-sectional view of another type of linear sliding rail structure according to the invention.
Figure 34:
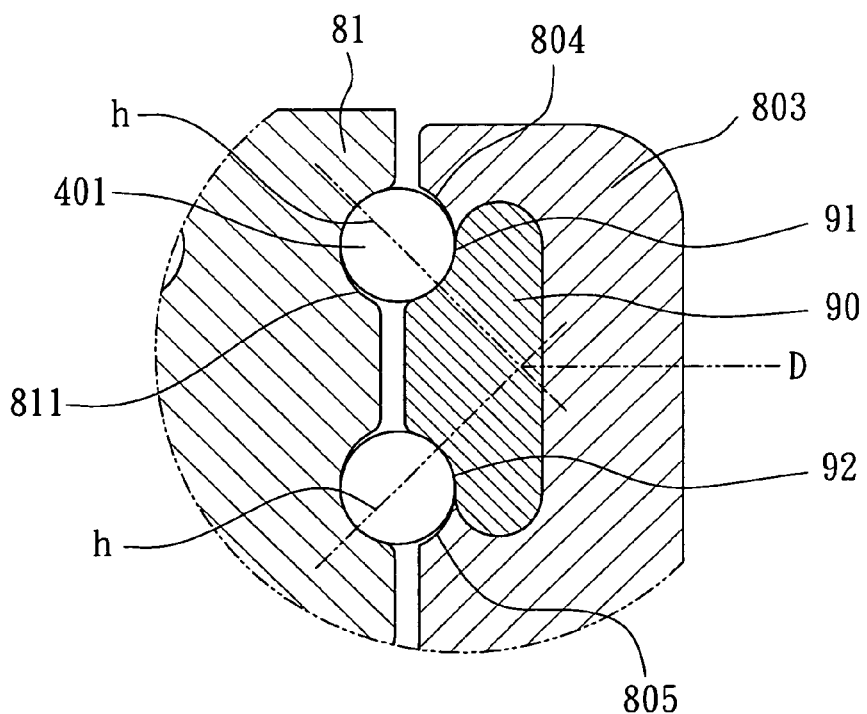
FIG. 34 is a partially enlarged view of the linear sliding rail structure in FIG. 33.

Referring to FIGS. 33 and 34, likewise, the contact portion of the two sidewalls of the U-shape rail 80 and the sliding base 81 is provided with a hardened material 90, which is composed of durable, reinforced and high hardness elements. A first contact surface 91 and a second contact surface 92 (as shown in FIG. 34) are formed along the contact arc between the interior walls of the first and second sliding paths 804, 805 and rolling balls 401. Accordingly, supporting intersection points C, D formed by the contact arcs of the first and second sliding paths 804, 805 and the rolling balls 401 will be formed in the hardened material, thereby efficiently enhancing the torque load for the U-shape rail 80 and the sliding base 81. In addition, the hardened material 90 can be chosen from a number of suitable materials, including steel, aluminum alloy, macromolecular material and sintered alloy, etc., which need be partially applied to between the supporting intersection points C and D, thereby efficiently minimizing the costs for manufacturing materials.

Concluded above, the invention is provided subject to an improvement for the integrally formed ends of the prior art, which cause inconvenience in maintenance. The invention can allow the ends assembled and exchanged, thereby ease maintenance and minimize costs.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a liner sliding rail circulating device, comprising:
    a rail having an "H" shaped cross-section and sliding paths provided at two sides thereof;
    a sliding base provided with rolling elements inside and an aperture at an interior wall for receiving the rolling elements that are rolling between the sliding paths and the aperture of the sliding rail in order to drive the sliding base to operate on the rail;
    two end members fastened to two ends of the aperture to serve as a circulative turning path for the rolling elements;
    wherein each of the end members comprises a left end block, a middle end block, a right end block, a middle sustainer, a lower sustainer, a chain sleeve and a circulating partition, the middle sustainer being provided with extruding ribs at two sides, the left and right end blocks being provided with clamping frames for claming the ribs, engaging grooves being provided at the left and right end blocks of different height for receiving an upper sustainer, the middle sustainer and the lower sustainer, the upper sustainer being provided at a top of a hollow of the sliding base, the middle sustainer and the lower sustainer being provided at two sides of the hollow, anti-dust strips being adhered to a lower rim of the upper sustainer, insertion pieces being formed at sides of the upper sustainer, the middle sustainer and the lower sustainer, engaging grooves corresponding to the insertion pieces being provided at the left end block and the right end block, recessive U-turn paths correspondingly matching the aperture of the sliding base being provided at an inner rim of the left end block and the right end block for providing a guide for the rolling elements, the left end block and the right end block being provided with positioning posts engaged with the circulating partition thereby enabling the circulating partition and an anti-dust cover to be fixed to front and rear ends of the sliding base;
    whereby the end members can be assembled as a module and can be fixed on front and rear ends of the sliding base for providing a circulative turning path for the rolling elements.

2. The structure of a linear sliding rail circulating device as claimed in claim 1, wherein the left end block and the right end block are formed with an extruding step adjacent to the sliding path.

3. The structure of a linear sliding rail circulating device as claimed in claim 2, wherein the extruding step is an inclined plane.

4. The structure of a linear sliding rail circulating device as claimed in claim 1, wherein positioning posts are provided on a center of a bottom of the upper sustainer, and positioning holes are provided at a center of an upper anti-dust strip for engaging and fastening with respective positioning holes such that the upper sustainer can be combined with the upper anti-dust strip.

5. The structure of a linear sliding rail circulating device as claimed in claim 1, wherein the upper sustainer is provided with a partition strip along a central line of a bottom, along which splints are vertically provided with corresponding splints at two sides; an edge of the upper anti-dust strip is provided with sheets which are directly engaged between the splints, such that the upper sustainer and the upper anti-dust strip combine together.

6. The structure of a linear sliding rail circulating device as claimed in claim 1, wherein the circulating partition is provided with a guide hole and an extruding surrounding wall at an upper end lower ends, and the extruding surrounding wall is positioned in the aperture of the sliding base and provided with locking extrusions for engaging gaps on a rear end of the chain sleeve.

7. The structure of a linear sliding rail circulating device as claimed in claim 1, wherein each of upper and lower ends of the circulating partition is provided with a guide hole and an extruding surrounding wall, each side of which is provided with a clamping block; unconnected first thin walls are extended inwardly between the two clamping blacks, while second thin walls are provided at a rim of the chain sleeve; a locking extrusion is provided at an interior of a middle section of the second thin walls for engaging with the unconnected first walls such that the first thin walls would match the second thin walls to fill up gaps of the surrounding wall.

8. The structure of a linear sliding rail circulating device as claimed in claim 1, wherein each of upper and lower ends of the circulating partition is provided with an extruding surrounding wall, which is provided with openings for correspondingly combining with lateral openings at upper and lower ends of the chain sleeve for positioning chains of the wiling elements.

\* \* \* \* \*